United States Patent
Ellmer

(10) Patent No.: US 11,524,678 B2
(45) Date of Patent: Dec. 13, 2022

(54) ENERGY-OPTIMIZED FORCED REGENERATION OF A PARTICLE FILTER OF A HYBRID VEHICLE

(71) Applicant: Vitesco Technologies GmbH, Hannover (DE)

(72) Inventor: Dietmar Ellmer, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/283,437

(22) PCT Filed: Sep. 26, 2019

(86) PCT No.: PCT/EP2019/076074
§ 371 (c)(1),
(2) Date: Apr. 7, 2021

(87) PCT Pub. No.: WO2020/074268
PCT Pub. Date: Apr. 16, 2020

(65) Prior Publication Data
US 2021/0347352 A1    Nov. 11, 2021

(30) Foreign Application Priority Data

Oct. 8, 2018   (DE) ..................... 10 2018 217 169.6

(51) Int. Cl.
*B60W 20/16*   (2016.01)
*B60W 10/06*   (2006.01)
(Continued)

(52) U.S. Cl.
CPC ............ *B60W 20/16* (2016.01); *B60W 10/06* (2013.01); *B60W 10/08* (2013.01); *F01N 3/021* (2013.01);
(Continued)

(58) Field of Classification Search
CPC ...... B60W 20/16; B60W 10/06; B60W 10/08; B60W 2530/12; B60W 2510/068;
(Continued)

(56) References Cited

U.S. PATENT DOCUMENTS

2003/0145582 A1    8/2003   Bunting .......................... 60/297
2006/0168951 A1*   8/2006   Opris ....................... F01N 3/027
                                                              60/297

(Continued)

FOREIGN PATENT DOCUMENTS

CN          103930327 A       7/2014    ............ B60W 10/06
DE       10 2015 211 570     12/2016    ............... F01N 9/00
(Continued)

OTHER PUBLICATIONS

Search Report for International Application No. PCT/EP2019/076074, 5 pages, dated Dec. 5, 2019.
(Continued)

*Primary Examiner* — Brandon D Lee
(74) *Attorney, Agent, or Firm* — Slayden Grubert Beard PLLC

(57) ABSTRACT

Various embodiments include a control system for the regeneration of a particle filter in an exhaust gas flow of an internal combustion engine of a hybrid vehicle including an electric machine comprising: a particle filter; a temperature sensor measuring an actual temperature of the filter; a first heat source upstream of the filter; and a controller. The controller is programmed to: determine a temperature difference between a setpoint temperature for regeneration of the particle filter and the actual temperature of the particle filter; calculate a power output difference to be applied based at least in part on the temperature difference; and control the first heat source using the power output difference.

15 Claims, 2 Drawing Sheets

(51) Int. Cl.
*B60W 10/08* (2006.01)
*F01N 3/023* (2006.01)
*F01N 9/00* (2006.01)
*F02D 41/02* (2006.01)
*F01N 3/021* (2006.01)

(52) U.S. Cl.
CPC ............ *F01N 3/023* (2013.01); *F01N 9/002* (2013.01); *F02D 41/027* (2013.01); *B60W 2530/12* (2013.01); *F01N 2560/06* (2013.01); *F01N 2590/11* (2013.01); *F01N 2900/1602* (2013.01); *F02D 2200/0802* (2013.01)

(58) Field of Classification Search
CPC ............ B60W 2710/0694; F01N 3/021; F01N 3/023; F01N 9/002; F01N 2560/06; F01N 2590/11; F01N 2900/1602; F01N 2560/025; F01N 2900/1606; F01N 2900/1631; F01N 3/0238; F01N 3/027; F01N 3/2006; F01N 11/002; F01N 11/005; F02D 41/027; F02D 2200/0802; B60Y 2300/476; B60Y 2200/92; B60Y 2400/302; Y02T 10/62; Y02T 10/12; Y02T 10/40; Y02A 50/20; Y04S 10/126
See application file for complete search history.

(56) References Cited

U.S. PATENT DOCUMENTS

| | | | |
|---|---|---|---|
| 2008/0282674 A1 | 11/2008 | Gonze | 60/285 |
| 2009/0113874 A1 | 5/2009 | Mckee | 60/272 |
| 2011/0072802 A1* | 3/2011 | Bidner | F01N 3/30 60/287 |
| 2011/0131950 A1* | 6/2011 | Parnin | F01N 9/002 60/274 |
| 2012/0079822 A1 | 4/2012 | Yacoub | 60/597 |
| 2013/0047607 A1* | 2/2013 | Petrovic | F02D 21/08 60/274 |
| 2013/0186063 A1* | 7/2013 | Douglas | F02D 41/029 60/276 |
| 2017/0254248 A1* | 9/2017 | Everly | F01N 3/023 |
| 2018/0245492 A1 | 8/2018 | Higa | F01N 3/027 |
| 2019/0277176 A1* | 9/2019 | Nakayama | B60W 20/16 |
| 2019/0301329 A1 | 10/2019 | Zink | F01N 3/023 |

FOREIGN PATENT DOCUMENTS

| | | | | |
|---|---|---|---|---|
| DE | 10 2016 207 667 | | 11/2017 | ............... F01N 9/00 |
| JP | 2010125975 A | | 6/2010 | ............... B60K 6/48 |

OTHER PUBLICATIONS

Search Report for Application No. 10 2018 217 169.6, 7 pages, dated Oct. 1, 2019.
Chinese Office Action, Application No. 201980066343.9, 24 pages, dated Feb. 25, 2022.
Korean Office Action, Application No. 1020217012771, 21 pages, dated Sep. 14, 2022.

* cited by examiner

ENERGY-OPTIMIZED FORCED REGENERATION OF A PARTICLE FILTER OF A HYBRID VEHICLE

CROSS-REFERENCE TO RELATED APPLICATIONS

This application is a U.S. National Stage Application of International Application No. PCT/EP2019/076074 filed Sep. 26, 2019, which designates the United States of America, and claims priority to DE Application No. 10 2018 217 169.6 filed Oct. 8, 2018, the contents of which are hereby incorporated by reference in their entirety.

TECHNICAL FIELD

The present disclosure relates to vehicles. Various embodiments of the teachings herein may include control systems for the regeneration of a particle filter in an exhaust gas flow for an internal combustion engine and/or for an internal combustion engine of a hybrid vehicle.

BACKGROUND

A particle filter (Gasoline Particulate Filter, GPF) can be used in a gasoline engine in order to lower the emission values of particles, in particular of pollutant particles, in the exhaust gas of the engine. Particle filters can filter out the number of particles in the raw exhaust gas of the engine, up to a proportion of over 90%. However, when the outside temperature is cold, for example, the number of particles can only partially be reduced to a sufficient extent by internal engine measures.

Furthermore, these particle filters regularly need regeneration in which the filter is burned free again and not clogged. For this process of burning off the so-called filter cake, an increased exhaust gas temperature level is required upstream of the particle filter. The required exhaust gas temperature level is approximately at or above 600° C. In particular when the outside temperature is low, during low-load and short-distance journeys, it is possible that this temperature is not reached; as a result, the particle filter can experience such high loading that the exhaust-gas back pressure increases excessively.

In the worst case, this leads to combustion misfires in the internal combustion engine. It can therefore happen that the regeneration of the particle filter has to be forced so that there is no negative impairment of the gas exchange, the characteristics of the charge and thus the combustion. In particular in the case of a hybrid vehicle, this effect can occur to a greater extent because the internal combustion engine is operated over even shorter periods of time than in conventional vehicles. This increases the probability that the temperature level required for regeneration is not reached in such a system while driving.

SUMMARY

The teachings of the present disclosure may be used to overcome at least partially the disadvantages of the prior art. For example, some embodiments of the teachings of the present disclosure include a control system (10) for the regeneration of a particle filter (20) in an exhaust gas flow (36) for an internal combustion engine (31) of a hybrid vehicle (30), the hybrid vehicle (30) having the internal combustion engine (31) and an electric machine (32), the control system (10) having: a particle filter (20), a temperature sensor (25), which is arranged in the area of the particle filter (20) and is set up to determine an actual temperature (Ti) of the particle filter (20), a first heat source (21), which is arranged upstream in the exhaust gas flow (36), and a controller (15), which is set up to determine a temperature difference (Td) between a setpoint temperature (Ts) for the regeneration of the particle filter (20) and the actual temperature (Ti) of the particle filter (20), to determine from the temperature difference (Td) a power output difference (Pd) to be applied, and to impart to the first heat source (21) the power output difference (Pd) to be applied.

In some embodiments, there is at least one further heat source (22), wherein the at least one further heat source (22) is arranged upstream in the exhaust gas flow (36), wherein the controller (15) is set up in such a way that, if the power output difference (Pd) to be applied is greater than the power output of the first heat source (21), it imparts to the at least one further heat source (22) the power output difference (Pd) to be applied.

As another example, some embodiments include a control system (10) for the regeneration of a particle filter (20) in an exhaust gas flow (36) for an internal combustion engine (31) of a hybrid vehicle (30), the hybrid vehicle (30) having the internal combustion engine (31) and an electric machine (32), the control system (10) having: a particle filter (20), a temperature sensor (25), which is arranged in the region of the particle filter (20), and a controller (15), which is set up to determine a temperature difference (Td) between a setpoint temperature (Ts) for the regeneration of the particle filter (20) and an actual temperature (Ti) of the particle filter (20), to determine from the temperature difference (Td) a power output difference (Pd) to be applied, and to switch the electric machine (32) of the hybrid vehicle (30) to a generator mode, so that the increase in the load on the internal combustion engine (31) has the effect that the actual temperature (Ti) of the particle filter (20) is increased by the temperature difference (Td).

In some embodiments, the controller (15) is set up to interrupt the imparting of the power output difference (Pd) to be applied to the first heat source (21) and/or the at least one further heat source (22) in order to observe the thermal inertia of the heat sources (21, 22).

In some embodiments, the controller (15) is also set up in such a way that, if the setpoint temperature (Ts) for the regeneration of the particle filter (20) is reached or exceeded, it operates the internal combustion engine (31) within a first temperature range (T1) in such a way that the internal combustion engine (31) delivers high-oxygen exhaust gas, and operates the internal combustion engine (31) within a second temperature range (T2) in such a way that the internal combustion engine (31) delivers low-oxygen exhaust gas.

In some embodiments, the controller (15) is also set up in such a way that, if the setpoint temperature (Ts) for the regeneration of the particle filter (20) is reached or exceeded and the electric machine (32) can provide the entire requested torque, it operates the internal combustion engine (31) in an overrun mode or in a stationary mode.

In some embodiments, the controller (15) is also set up in such a way that, if the temperature is below the setpoint temperature (Ts) for the regeneration of the particle filter (20), it determines a resulting power output difference (Pr) from a resulting temperature difference (Tr) between the setpoint temperature (Ts) and a resulting actual temperature (Tj) of the particle filter (20), ends the overrun mode or the stationary mode of the internal combustion engine (31), and switches the electric machine (32) of the hybrid vehicle (30)

to a generator mode, so that the increase in the load on the internal combustion engine (31) has the effect that the resulting actual temperature (Tj) of the particle filter (20) is increased by the resulting temperature difference (Tr).

In some embodiments, the controller (15) is also set up to interrupt the regeneration of a particle filter (20) if a predefined emission is exceeded.

As another example, some embodiments include a method for the regeneration of a particle filter (20) in an exhaust gas flow (36) for an internal combustion engine (31) of a hybrid vehicle (30), the hybrid vehicle (30) having the internal combustion engine (31) and an electric machine (32), with the steps of: determining, by means of a temperature sensor (25) which is arranged in the area of the particle filter (20), a temperature difference (Td) between a setpoint temperature (Ts) for the regeneration of the particle filter (20) and an actual temperature (Ti) of the particle filter (20); determining, by means of a controller (15), a power output difference (Pd) to be applied from the temperature difference (Td); imparting to a first heat source (21) the power output difference (Pd) to be applied, the first heat source (21) being arranged upstream in the exhaust gas flow (36); if the power output difference (Pd) to be applied is greater than the power output of the first heat source (21), imparting to at least one further heat source (22) the power output difference (Pd) to be applied, the at least one further heat source (22) being arranged upstream in the exhaust gas flow (36).

As another example, some embodiments include a method for the regeneration of a particle filter (20) in an exhaust gas flow (36) for an internal combustion engine (31) of a hybrid vehicle (30), the hybrid vehicle (30) having the internal combustion engine (31) and an electric machine (32), with the steps of: determining, by means of a temperature sensor (25) which is arranged in the area of the particle filter (20), a temperature difference (Td) between a setpoint temperature (Ts) for the regeneration of the particle filter (20) and an actual temperature (Ti) of the particle filter (20); determining, by means of a controller (15), a power output difference (Pd) to be applied from the temperature difference (Td); and if the power output difference (Pd) to be applied is greater than the power output of the first heat source (21), switching the electric machine (32) of the hybrid vehicle (30) to a generator mode, so that the increase in the load on the internal combustion engine (31) has the effect that the actual temperature (Ti) of the particle filter (20) is increased by the temperature difference (Td).

In some embodiments, if the setpoint temperature (Ts) for the regeneration of the particle filter (20) is reached or exceeded, it operates the internal combustion engine (31) within a first temperature range (T1) so that the internal combustion engine (31) delivers high-oxygen exhaust gas, and it operates the internal combustion engine (31) within a second temperature range (T2) so that the internal combustion engine (31) delivers low-oxygen exhaust gas; and/or if the setpoint temperature (Ts) for the regeneration of the particle filter (20) is reached or exceeded and the electric machine (32) can provide the entire requested torque, it operates the internal combustion engine (31) in an overrun mode or in a stationary mode.

As another example, some embodiments include a program element which, if it is executed on a controller (15), instructs the controller (15) to carry out the steps of the method as described herein.

As another example, some embodiments include a computer-readable medium on which a program element as described herein is stored.

As another example, some embodiments include the use of a control system as described herein or a method as described herein for the regeneration of a particle filter (20) in an exhaust gas flow (36) for an internal combustion engine (31) of a hybrid vehicle (30).

BRIEF DESCRIPTION OF THE DRAWINGS

For further clarification, the teachings herein are described on the basis of embodiments shown in the figures. These embodiments are to be understood merely as examples and not as limitations. In the figures.

DETAILED DESCRIPTION

Figure 1:
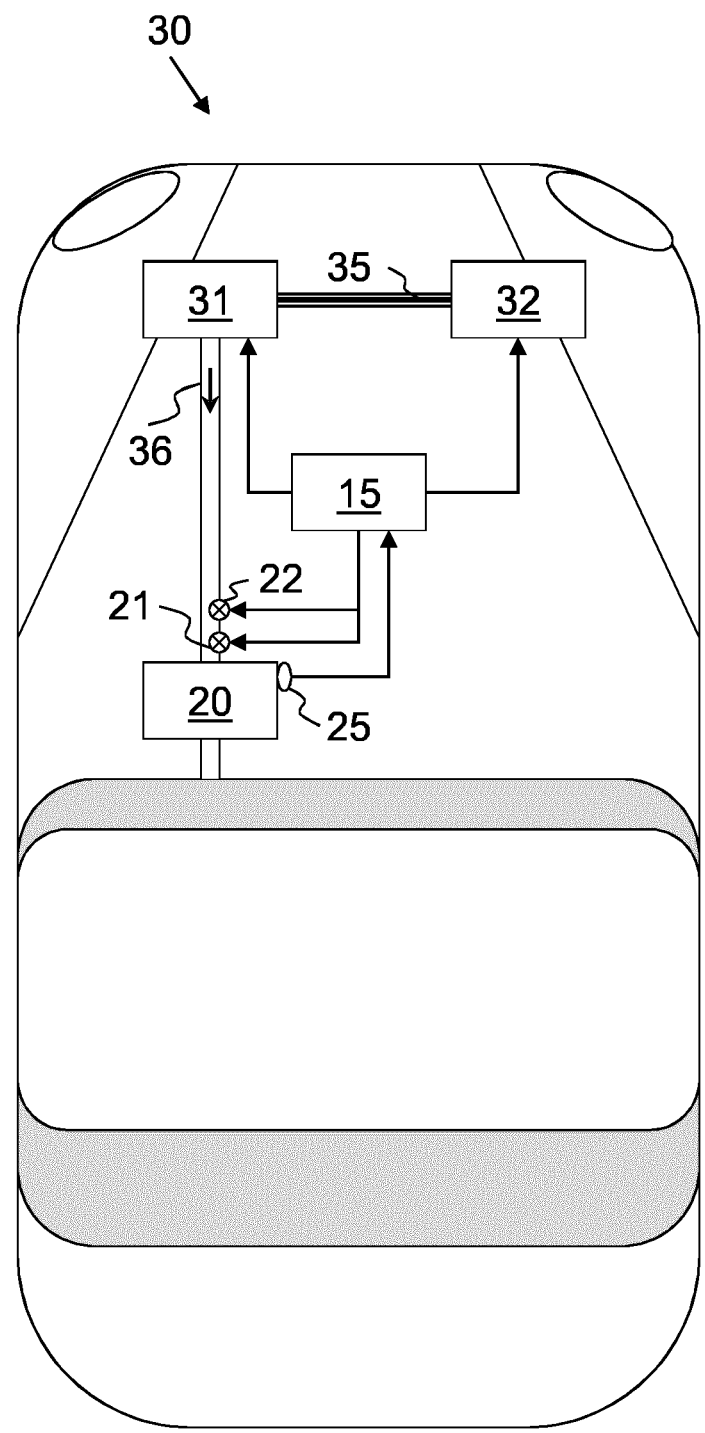
FIG. 1 shows a vehicle with a control system according to an embodiment of teachings of the present disclosure.

In some embodiments of the teachings herein, there is a control system for the regeneration of a particle filter in an exhaust gas flow for an internal combustion engine of a hybrid vehicle, the hybrid vehicle having the internal combustion engine and an electric machine. The vehicle may comprises, for example, a motor vehicle, such as a car, bus or truck, or else a rail vehicle, or a motorcycle. The combustion engine or internal combustion engine (ICE) may be for example a gasoline engine, a Wankel engine, a diesel engine, or any other conceivable form of drive unit in which particles which are harmful to health arise when liquid or gaseous fuel reacts with oxygen due to the thermodynamic boundary conditions and the formation of the mixture. The internal combustion engine may be coupled to the electric machine directly or via a clutch.

In some embodiments, the control system has a particle filter and a temperature sensor arranged in the area of the particle filter and which is set up to determine an actual temperature of the particle filter. In some embodiments, the actual temperature can be approximated on the basis of a model, which can take place in a control system. In some embodiments, the control system has a first heat source, which is arranged upstream in the exhaust gas flow. In some embodiments, the control system has a controller, which is set up to determine a temperature difference between a setpoint temperature for the regeneration of the particle filter and the actual temperature of the particle filter, to determine from the temperature difference a power output difference to be applied, and to impart to the first heat source the power output difference to be applied.

In some embodiments, the temperature sensor may be arranged inside the particle filter; it may be arranged upstream or downstream in the exhaust gas flow. The temperature sensor may use a model to infer the temperature of the particle filter from a temperature of the temperature sensor and thereby determine the actual temperature of the particle filter. The heat source may be designed as a single heat source or as multiple heat sources. In particular in the case of the single heat source, the heat source may be arranged in the particle filter or close to the particle filter upstream, that is to say between the internal combustion engine and the particle filter. The heat source may be designed for example as an electrically heatable heating disk.

In some embodiments, the setpoint temperature for the regeneration of the particle filter may be for example at or above 600° C. This setpoint temperature may for example be entered in the controller as a constant value for the particle filter that the vehicle uses. In some embodiments, the controller determines a temperature difference between the setpoint temperature for the regeneration of the particle filter and the actual temperature of the particle filter and uses this to determine a power output difference to be applied. The controller then acts on or activates the first heat source, which leads to the power output difference to be applied being imparted.

This allows the regeneration of the particle filter to be carried out in a reliable manner if this is determined to be necessary, for example by means of a monitoring module of the particle filter. This prevents the particle filter from becoming clogged. In this way, the particle emissions of the vehicle can always be kept in a permitted range, irrespective of for instance the outside temperature and the length of the route. The regeneration may be carried out automatically by means of the control system. This can ensure that the regeneration takes place independently of a command from a driver or the driving profile specified by the driver. This can also increase the convenience for the driver, since he no longer has to actively initiate this process, e.g. when requested by an MMI (man-machine interface) by implementing a driving profile—for example a high-load journey on the freeway.

In some embodiments, the regeneration of the particle filter is triggered when a predefined threshold value for the loading of the particle filter is reached or exceeded. The threshold value may be for example 90% or 95% of the capacity of the particle filter, with 100% capacity describing the loading from which further loading leads to a relevant impairment of the internal combustion engine or other undesired technical processes.

In some embodiments, the regeneration of the particle filter is triggered dependent on the state of charge of the energy source of the vehicle, for example the car battery. It can thus be ensured that the energy source of the vehicle for supplying the heat sources has a sufficient state of charge, for example for the heating-up process.

In some embodiments, the control system also has at least one further heat source, wherein the at least one further heat source is arranged upstream in the exhaust gas flow, and wherein the controller is set up in such a way that, if the power output difference to be applied is greater than the power output of the first heat source, it imparts to the at least one further heat source the power output difference to be applied. Good scalability of the heat sources can thus be achieved. In addition, it can in this way be made possible that at least one of the heat sources can also be used for other purposes, for example for heating a catalytic converter.

In some embodiments, there is a control system for the regeneration of a particle filter in an exhaust gas flow for an internal combustion engine of a hybrid vehicle, the hybrid vehicle having the internal combustion engine and an electric machine. The control system has a particle filter and at least one temperature sensor, which is arranged in the area of the particle filter and which is set up to determine an actual temperature of the particle filter. In some embodiments, the control system has a controller, which is set up to determine a temperature difference between a setpoint temperature for the regeneration of the particle filter and the actual temperature of the particle filter and to determine from the temperature difference a power output difference to be applied. The temperature sensor may be arranged inside the particle filter; it may be arranged upstream or downstream in the exhaust gas flow. The temperature sensor may use a model to infer the temperature of the particle filter from a temperature of the temperature sensor and thereby determine the actual temperature of the particle filter.

In some embodiments, the controller is also set up to switch the electric machine of the hybrid vehicle to a generator mode, so that the increase in the load on the internal combustion engine has the effect that the actual temperature of the particle filter is increased by the temperature difference. This method of increasing the actual temperature of the particle filter by the temperature difference can be chosen both when one or more heat sources are present in the vehicle and when there is no heat source in the vehicle. If one or more heat sources are present, various strategies can be chosen to combine the heat source with the generator mode.

For example, the generator mode of the electric machine may be given preference, so that it is first attempted to close the temperature difference by means of the generator mode and that only then does the controller act on the one or more heat sources. The one or more heat sources may also be given preference, so that it is first attempted to close the temperature difference by means of the heat source and that only then is the generator mode chosen. In some embodiments, the generator mode may take place in parallel with the activation of the one or more heat sources, since this is advantageous in terms of energy, since the energy does not have to be input into or removed from the energy store. The strategy chosen in each case may for example be dependent on the actual temperature of the particle filter, the state of charge of the energy source of the vehicle and/or a calculation of the resulting total emissions.

In some embodiments, the controller is set up to interrupt the imparting of the power output difference to be applied to the first heat source and/or the at least one further heat source in order to observe the thermal inertia of the heat source, i.e. the one or more heat sources. In this way, for example, excessive power consumption by the heat source and/or excessive and/or unnecessary heating of the heat source could be avoided.

In some embodiments, the controller is also set up in such a way that, if the setpoint temperature for the regeneration of the particle filter is reached or exceeded, it switches off the heat sources and operates the internal combustion engine within a first temperature range of the particle filter in such a way that the internal combustion engine delivers high-oxygen exhaust gas, and operates the internal combustion engine within a second temperature range of the particle filter in such a way that the internal combustion engine delivers low-oxygen exhaust gas.

The second temperature range has a higher temperature than the first temperature range. The temperature ranges may be disjoint. The second temperature range may for example be chosen so that it is higher than the setpoint temperature for the regeneration of the particle filter and, in particular, is in a temperature range in which measures are taken to avoid damage to the particle filter due to local overheating during burning off.

In some embodiments, the measures include the method of operating the internal combustion engine within the second temperature range in such a way that the internal combustion engine delivers low-oxygen exhaust gas. The first temperature range lies between the setpoint temperature for the regeneration of the particle filter and the second temperature range. The internal combustion engine is operated within the first temperature range in such a way that the internal combustion engine delivers high-oxygen exhaust gas.

The "low-oxygen exhaust gas" can be defined for example by means of the so-called lambda value (also called the mass ratio of air and fuel, combustion air ratio, air ratio or air number). A lambda=1 is the air ratio if all of the fuel molecules react completely with the oxygen in the air without a lack of oxygen or unburned fuel. A lambda<1 is defined as "low in oxygen" and a lambda>1 as "high in oxygen". In this embodiment, there can therefore be a change in the oxygen content in the exhaust gas between values of lambda<=1 and lambda>1.

In some embodiments, it is not only advantageous that the temperature in the particle filter can be checked and kept below a maximum value, and consequently overheating of the particle filter can be avoided. In addition, a three-way catalytic converter in the vehicle can be operated in the conversion window, in the range of a functional or even optimal temperature, for as long as possible.

In some embodiments, the controller is also set up to operate the internal combustion engine in an overrun mode or in a stationary mode if the setpoint temperature for the regeneration of the particle filter has been reached or exceeded and the electric machine can provide an entire requested torque. If therefore the temperature is high enough to operate the regeneration, then the internal combustion engine can be "switched off", i.e. in particular no longer be supplied with fuel. Depending on the type of coupling between the internal combustion engine and the electric machine that is chosen, this leads to the internal combustion engine being operated in the overrun mode if the internal combustion engine and the electric machine are coupled. If the internal combustion engine and the electric machine are not coupled, the internal combustion engine is operated in the stationary mode. This can significantly reduce the exhaust gas flow.

In some embodiments, the controller is also set up in such a way that, if the temperature is below the setpoint temperature for the regeneration of the particle filter, it determines a resulting power output difference from a resulting temperature difference between the setpoint temperature and a resulting actual temperature of the particle filter, ends the overrun mode or the stationary mode of the internal combustion engine, and switches the electric machine of the hybrid vehicle to a generator mode, so that the increase in the load on the internal combustion engine has the effect that the resulting actual temperature of the particle filter is increased by the resulting temperature difference.

In the event that the temperature is below the setpoint temperature, and the regeneration of the particle filter is consequently interrupted, the internal combustion engine is "switched on" again—although the internal combustion engine is not absolutely necessary for propulsion of the vehicle—and the electric machine is switched to the generator mode. This takes place in such a way that the resulting actual temperature of the particle filter is increased by the resulting temperature difference. This causes only a slight increase in the emissions of the internal combustion engine; this may be the minimum emission required to maintain the functionality of the particle filter.

In some embodiments, the controller is also set up to interrupt the regeneration of a particle filter if a predefined emission is exceeded. This mode may be chosen for example if a certain environmental situation requires for example zero emissions.

In some embodiments, there is a method for the regeneration of a particle filter in an exhaust gas flow for an internal combustion engine of a hybrid vehicle, the hybrid vehicle having the internal combustion engine and an electric machine, with the steps of:

determining, by means of a temperature sensor which is arranged in the area of the particle filter and/or a temperature model, a temperature difference between a setpoint temperature for the regeneration of the particle filter and an actual temperature of the particle filter;

determining, by means of a controller, a power output difference to be applied from the temperature difference;

imparting to a first heat source the power output difference to be applied, the first heat source being arranged upstream of the particle filter in the exhaust gas flow;

if the power output difference to be applied is greater than the power output of the first heat source, imparting to at least one further heat source the power output difference to be applied, the at least one further heat source being arranged upstream of the first heat source in the exhaust gas flow.

In some embodiments, there is a method for the regeneration of a particle filter in an exhaust gas flow for an internal combustion engine of a hybrid vehicle, the hybrid vehicle having the internal combustion engine and an electric machine, with the steps of:

determining, by means of a temperature sensor which is arranged in the area of the particle filter, a temperature difference between a setpoint temperature for the regeneration of the particle filter and an actual temperature of the particle filter;

determining, by means of a controller, a power output difference to be applied from the temperature difference;

if the power output difference to be applied is greater than the power output of the first heat source, switching the electric machine of the hybrid vehicle to a generator mode, so that the increase in the load on the internal combustion engine has the effect that the actual temperature of the particle filter is increased by the temperature difference.

In some embodiments, the methods include one or more of the following further steps:

if the setpoint temperature for the regeneration of the particulate filter is reached or exceeded, it operates the internal combustion engine within a first temperature range so that the internal combustion engine delivers oxygen-rich exhaust gas, and operates the internal combustion engine within a second temperature range so that the internal combustion engine delivers low-oxygen exhaust gas; and or if the setpoint temperature for the regeneration of the particle filter is reached or exceeded and the electric machine can provide the entire requested torque, it operates the internal combustion engine in an overrun mode or in a stationary mode.

In some embodiments, there is a program element which, if it is executed on a controller as explained above and/or below, instructs the controller to carry out the steps of one of the methods explained above. In some embodiments, there is a computer-readable medium on which said program element is stored.

FIG. 1 shows a vehicle 30 with a control system 10 incorporating teachings of the present disclosure. The vehicle 30 is designed as a hybrid vehicle. The hybrid vehicle 30 has an internal combustion engine 31 and an electric machine 32, which are coupled by means of a coupling element 35. The coupling element 35 may be of a rigid design or have a clutch in order to separate the internal combustion engine 31 and the electric machine 32 if necessary. The internal combustion engine 31 has an exhaust gas flow 36, the exhaust gas flowing in the direction of the arrow to a particle filter 20.

A first heat source 21 and a further heat source 22 are arranged between the internal combustion engine 31 and the particle filter 20. The further heat source 22 may comprise a number of further heat sources 22. The first heat source 21 is arranged upstream in the exhaust gas flow 36, in direct proximity to the particle filter 20. The further heat source 22 is arranged further upstream than the first heat source 21 in the exhaust gas flow 36. A temperature sensor 25 is arranged in the area of the particle filter 20. The temperature sensor 25 supplies an actual temperature Ti of the particle filter 20 to a controller 15. The controller 15 is set up to control the heat sources 21 and 22 and the internal combustion engine 31 and the electric machine 32. In some embodiments, the vehicle may not have any of the heat sources 21 and 22.

Figure 2:
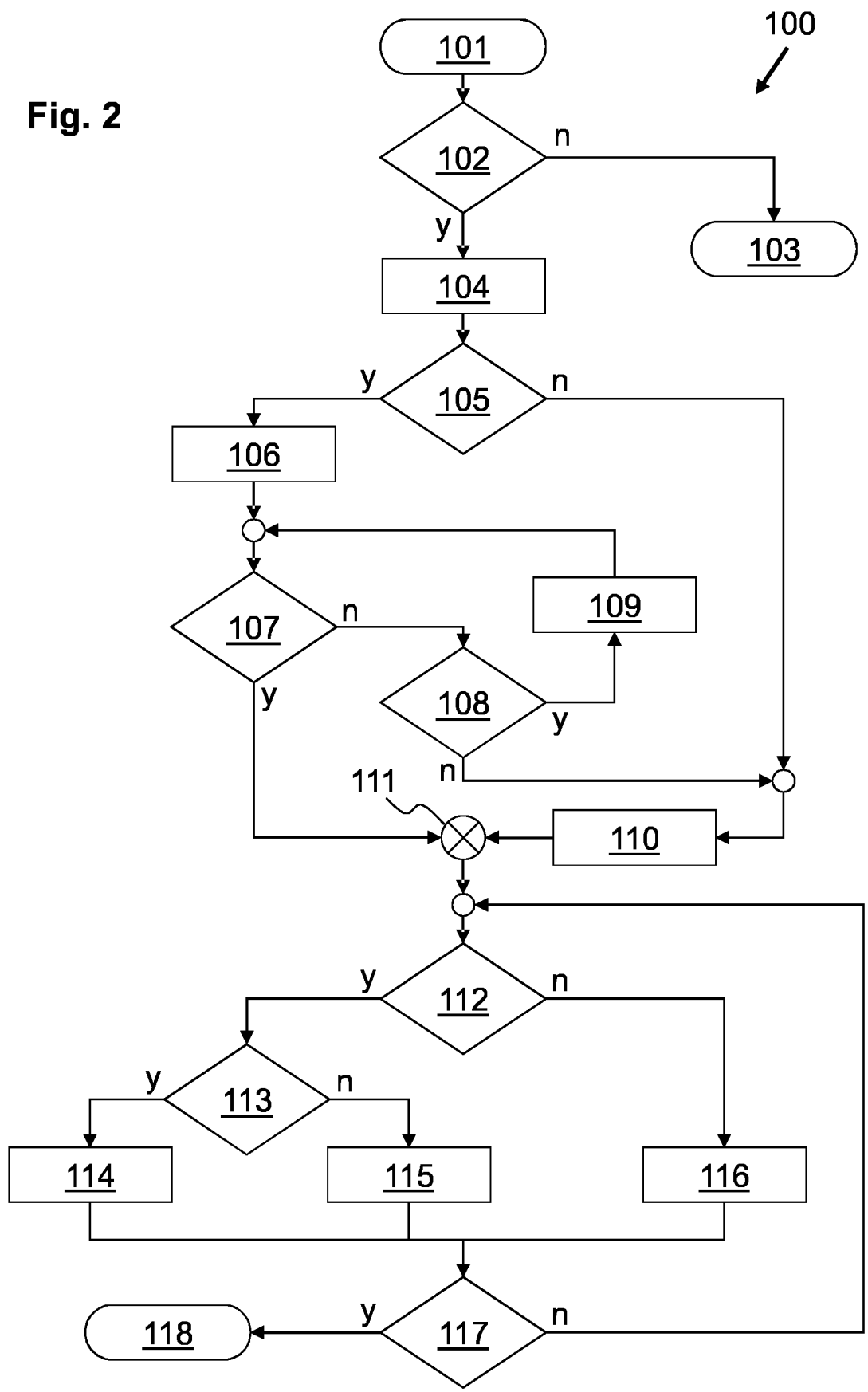
FIG. 2 shows a flow diagram with a method according to an embodiment of the teachings of the present disclosure.

FIG. 2 shows a flow diagram 100 with a method incorporating teachings of the present disclosure. The method starts with a step 101. In a step 102, it is checked whether a loading of the particle filter 20 of the vehicle 30 (see FIG. 1) has reached or exceeded a threshold value. The threshold value may be for example 90% or 95% of the maximum loading of the particle filter 20. If the load is below the threshold value, the method is ended in a step 103. Otherwise, in a step 104, a temperature difference Td between a setpoint temperature Ts for the regeneration of the particle filter and an actual temperature Ti of the particle filter 20 is determined by means of a temperature sensor 25, which is arranged in the area of the particle filter 20, and from this a power output difference Pd to be applied is determined by means of the controller 15 from the temperature difference Td.

In a step 105, it is checked whether at least one heat source 21 is present in the vehicle 30. If so, in a step 106, the power output difference Pd to be applied is imparted to the first heat source 21. In a step 107, it is checked whether the power output of the first heat source 21 is sufficient to completely provide the power output difference Pd to be applied. If so, then the setpoint temperature Ts for the regeneration of the particle filter 20 is reached or exceeded in a step 111 by this measure alone.

If the power output of the first heat source 21 is insufficient, then it is checked in a step 108 whether one or more further heat sources 22 are present. If so, then the controller acts on the one or more further heat sources 22 as required until the power output difference Pd to be applied has been completely applied. If there are no further heat sources, a branch is taken to a step 110. A branch is taken to step 110 from step 105 if there are no heat sources in the vehicle 30. In step 110, the electric machine 32 of the hybrid vehicle 30 is switched to a generator mode, so that the increase in the load on the internal combustion engine 31 has the effect that the actual temperature Ti of the particle filter 20 is increased by the temperature difference Td. Since in step 111 the temperature is high enough to operate the regeneration of the particle filter 20, the generator mode and/or the heat sources can be switched off.

In a step 112, it is checked whether the electric machine 32 can provide the entire torque that is required for the movement of the vehicle 30. If this is the case, a branch is taken to a step 116. In step 116, the internal combustion engine 31 is "switched off", i.e. in particular no longer supplied with fuel. Depending on the type of coupling between the internal combustion engine and the electric machine that is chosen, this leads to the internal combustion engine being operated in an overrun mode if the internal combustion engine and the electric machine are coupled. If the internal combustion engine and electric machine are not coupled, the internal combustion engine is operated in a stationary mode.

If the electric machine 32 cannot provide the entire torque, then a branch is taken from step 112 to a step 113. In step 113, it is checked whether the particle filter 20 is in a second temperature range T2. The second temperature range T2 may for example be chosen so that it is higher than the setpoint temperature for the regeneration of the particle filter 20 and, in particular, is in a temperature range in which measures are taken to avoid damage to the particle filter 20 due to local overheating during burning off. Within the second temperature range T2, in a step 114, the internal combustion engine 31 is operated in such a way that it supplies low-oxygen exhaust gas. If the temperature of the particle filter 20 is not in the second temperature range, then the temperature is in the first temperature range T1 and a branch is taken to a step 115. The first temperature range T1 lies between the setpoint temperature Ts for the regeneration of the particle filter 20 (see step 111) and the second temperature range T2. In step 115, the internal combustion engine is operated within the first temperature range T1 in such a way that the internal combustion engine 31 delivers high-oxygen exhaust gas.

After steps 114, 115, 116, it is checked, in a step 117, whether the loading of the particle filter 20 has been sufficiently reduced. If not, a further branch is taken to step 112. If so, the method is ended in a step 118. After the ending of the method in step 103 or 118, the method can be started again in step 101. In one embodiment, in normal operation of the vehicle 30, a repetition, in particular a regular repetition, of the method takes place.

Parts of the method mentioned can also be used in vehicles which only have an internal combustion engine and are not hybrid vehicles.

LIST OF REFERENCE SIGNS

10 Control system
15 Controller
20 Particle filter
21 First heat source
22 Further heat source
25 Temperature sensor
30 Vehicle, hybrid vehicle
31 Internal combustion engine
32 Electric machine
35 Coupling element
36 Exhaust gas flow
100 Flow diagram
101-118 Steps
T1, T2 First and second temperature range

What is claimed is:

1. A control system for the regeneration of a particle filter in an exhaust gas flow of an internal combustion engine of a hybrid vehicle including an electric machine, the control system comprising:
a particle filter;
a temperature sensor measuring an actual temperature of the particle filter;
a first heat source upstream of the particle filter in the exhaust gas flow; and
a controller programmed to:
determine a temperature difference between a setpoint temperature for regeneration of the particle filter and the actual temperature of the particle filter;

calculate a power output to be applied to the particle filter based at least in part on the temperature difference;
control the first heat source using the calculated power output; and
interrupt the application of power to the first heat source to observe the thermal inertia of the first heat source before resuming application of power to the first heat source.

2. The control system as claimed in claim 1, further comprising a second heat source upstream of the particle filter in the exhaust gas flow;
wherein if the calculated power output to be applied is greater than an available power output of the first heat source, the controller activates the second heat source using the calculated power output.

3. The control system as claimed in claim 2, wherein the controller interrupts the application of the power to the second heat source to observe the thermal inertia of the second heat source.

4. The control system as claimed in claim 1, wherein, if the setpoint temperature for the regeneration of the particle filter is reached or exceeded, the controller operates
the internal combustion engine within a first temperature range in such a way that the internal combustion engine delivers high-oxygen exhaust gas, and
operates the internal combustion engine within a second temperature range in such a way that the internal combustion engine delivers low-oxygen exhaust gas.

5. The control system as claimed in claim 1, wherein, if the setpoint temperature for the regeneration of the particle filter is reached or exceeded and the electric machine can provide the entire requested torque, the internal combustion engine operates in an overrun mode or in a stationary mode.

6. The control system as claimed in claim 5, wherein, if a new actual temperature resulting from control of the heat source is below the setpoint temperature for regeneration of the particle filter, the controller additionally:
determines a resulting power output from a resulting temperature difference between the setpoint temperature and the new actual temperature of the particle filter,
ends the overrun mode or the stationary mode of the internal combustion engine, and
switches the electric machine of the hybrid vehicle to a generator mode, so that the increase in the load on the internal combustion engine has the effect that the new actual temperature of the particle filter is increased by the resulting temperature difference.

7. The control system as claimed in claim 1, wherein the controller interrupts the regeneration of a particle filter if a predefined emission is exceeded.

8. A control system for the regeneration of a particle filter in an exhaust gas flow of an internal combustion engine of a hybrid vehicle having an electric machine, the control system comprising:
a particle filter;
a temperature sensor arranged in a region of the particle filter; and
a controller programmed to:
determine a temperature difference between a setpoint temperature for the regeneration of the particle filter and an actual temperature of the particle filter measured by the temperature sensor;
calculate a power output difference for the internal combustion engine to be applied based at least in part on the temperature difference; and
switch the electric machine to a generator mode, so that the increase in a load on the internal combustion engine causes the actual temperature of the particle filter to increase by the temperature difference,
wherein, if the setpoint temperature for the regeneration of the particle filter is reached or exceeded and the electric machine can provide the entire requested torque, the controller operates the internal combustion engine in an overrun mode or in a stationary mode, and
wherein, if a new actual temperature resulting from increasing the load of the internal combustion engine is below the setpoint temperature, the controller:
determines a resulting power output from a resulting temperature difference between the setpoint temperature and the new actual temperature of the particle filter;
ends the overrun mode or the stationary mode of the internal combustion engine; and
switches the electric machine to a generator mode, so that the increase in the load on the internal combustion engine increases the actual temperature of the particle filter by the resulting temperature difference.

9. The control system as claimed in claim 8, wherein the controller interrupts the power output applied to a first heat source and/or a second heat source to observe the thermal inertia of the first heat source and/or the second heat source.

10. The control system as claimed in claim 8, wherein, if the setpoint temperature for the regeneration of the particle filter is reached or exceeded, the controller operates the internal combustion engine within a first temperature range in such a way that the internal combustion engine delivers high-oxygen exhaust gas, and operates the internal combustion engine within a second temperature range in such a way that the internal combustion engine delivers low-oxygen exhaust gas.

11. The control system as claimed in claim 8, wherein the controller interrupts the regeneration of a particle filter (20) if a predefined emission is exceeded.

12. A method for the regeneration of a particle filter in an exhaust gas flow of an internal combustion engine of a hybrid vehicle including an electric machine, the method comprising:
determining a temperature difference between a setpoint temperature for the regeneration of the particle filter and an actual temperature of the particle filter;
calculating a power output to be applied to the particle filter based at least in part on the temperature difference;
triggering a first heat source based on the calculated power output, the first heat source arranged upstream of the particle filter in the exhaust gas flow;
if the power output to be applied is greater than a power output capacity of the first heat source, triggering a second heat source using the power output, the second heat source arranged upstream of the particle filter in the exhaust gas flow; and
interrupting the application of the power applied to the first heat source and/or the second heat source to observe the thermal inertia of the heat sources before applying further power to one or more of the heat sources.

13. The method as claimed in claim 12, further comprising:
if the setpoint temperature is reached or exceeded, operating the internal combustion engine within a first temperature range so that the internal combustion engine delivers high-oxygen exhaust gas, and operating the internal combustion engine within a second temperature range so that the internal combustion engine delivers low-oxygen exhaust gas; and/or if the setpoint temperature for the regeneration of the particle filter is reached or exceeded and the electric machine can provide the entire requested torque, operating the internal combustion engine in an overrun mode or in a stationary mode.

14. A method for the regeneration of a particle filter in an exhaust gas flow of an internal combustion engine in a hybrid vehicle with an electric machine, the method comprising:

determining a temperature difference between a setpoint temperature for the regeneration of the particle filter and an actual temperature of the particle filter;

calculating a power output to be applied to the particle filter based at least in part on the temperature difference; and if the calculated power output to be applied is greater than an available power output of a first heat source, switching the electric machine to a generator mode, so that the increase in the load on the internal combustion engine increases the actual temperature of the particle filter by the temperature difference.

15. The method as claimed in claim 14, further comprising:

if the setpoint temperature is reached or exceeded, operating the internal combustion engine within a first temperature range so that the internal combustion engine delivers high-oxygen exhaust gas, and operating the internal combustion engine within a second temperature range so that the internal combustion engine delivers low-oxygen exhaust gas; and/or if the setpoint temperature is reached or exceeded and the electric machine can provide the entire requested torque, operating the internal combustion engine in an overrun mode or in a stationary mode.

* * * * *